Patented Jan. 25, 1944

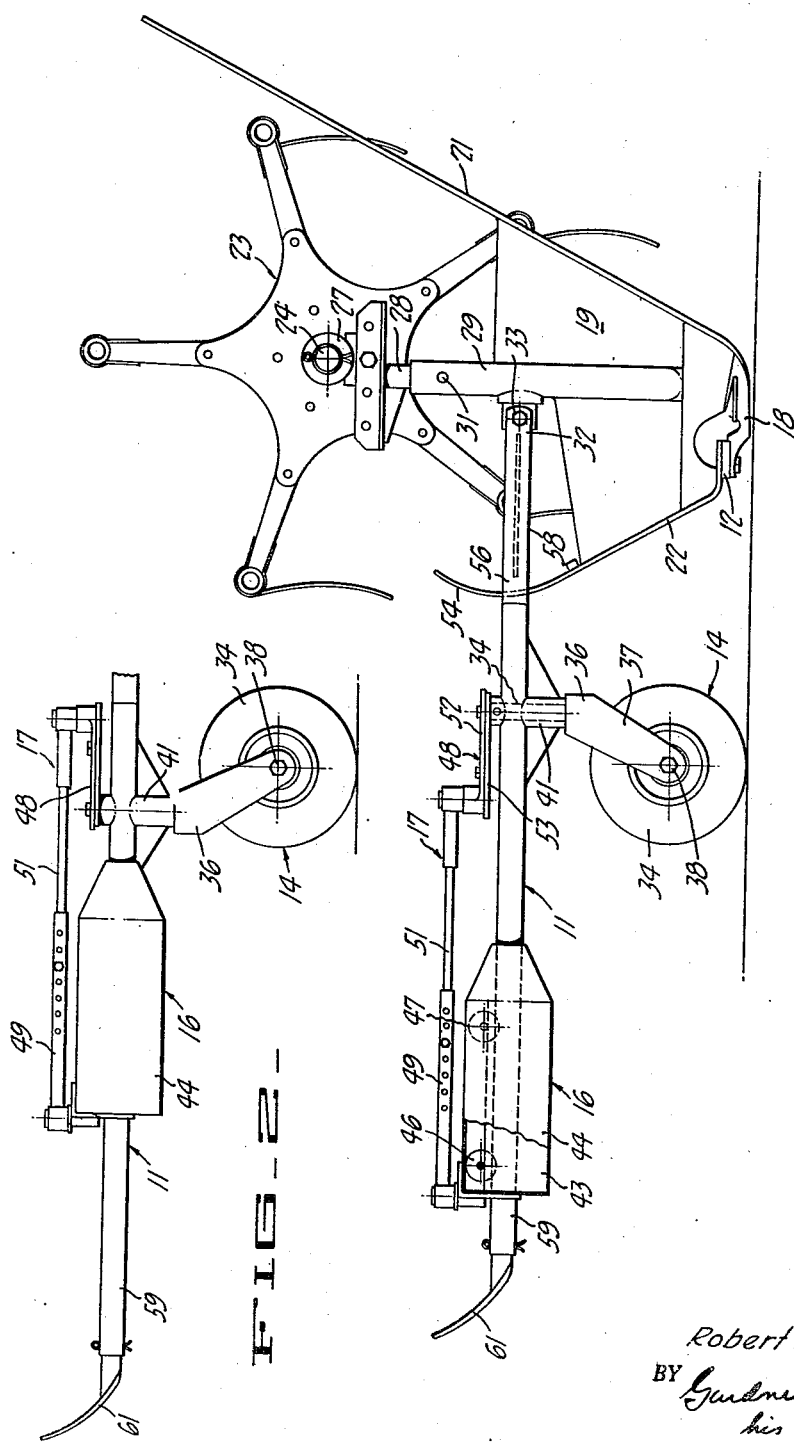

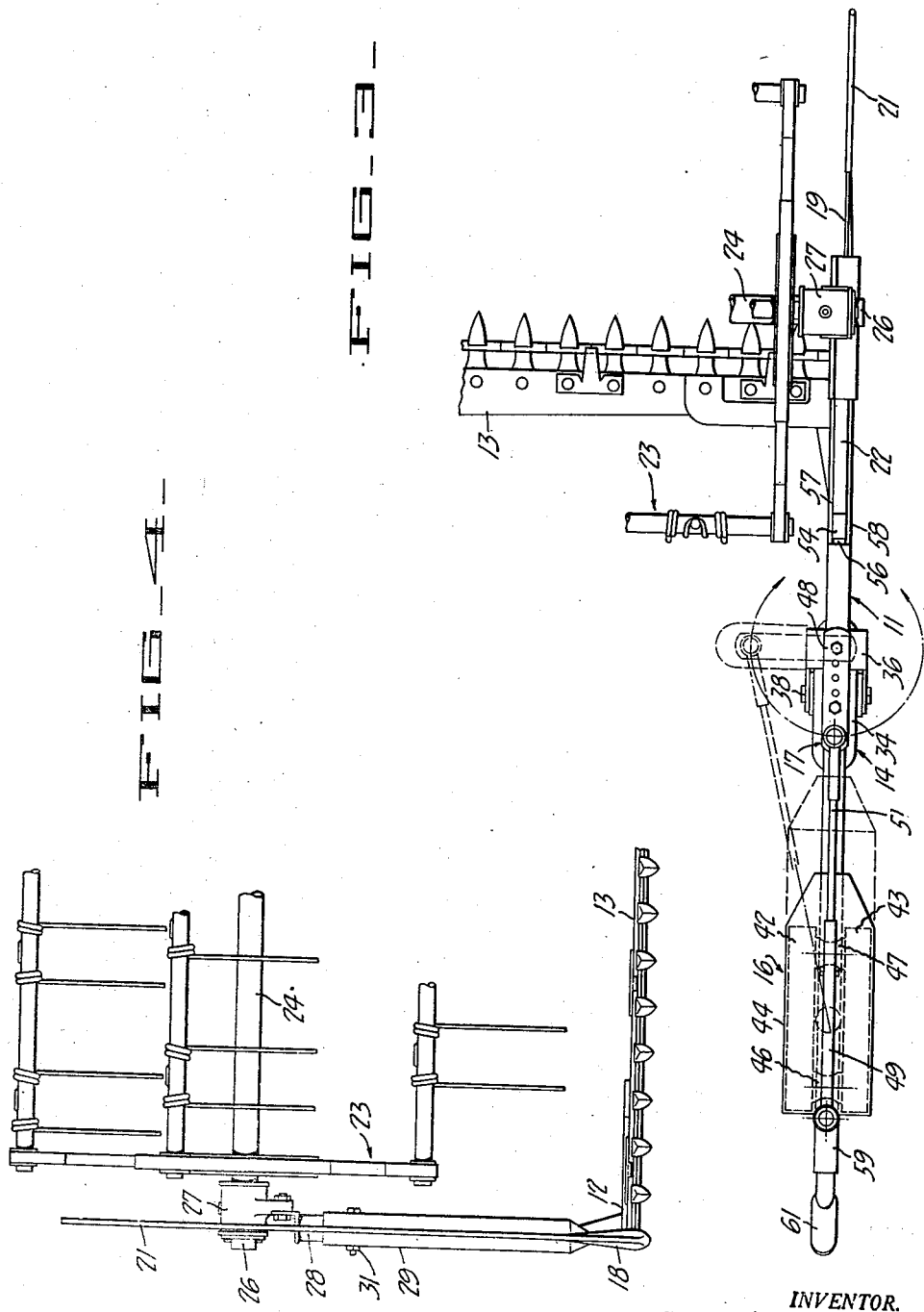

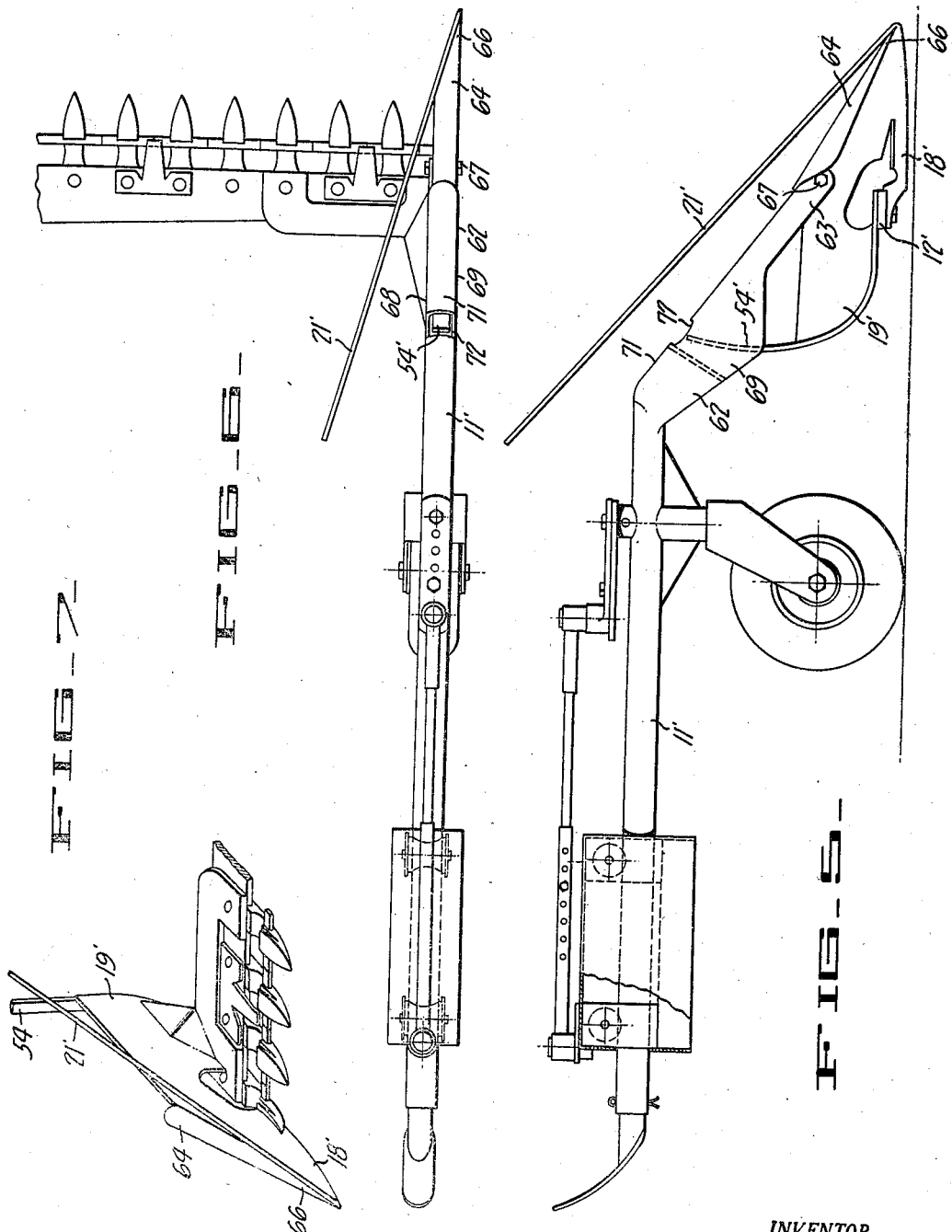

2,339,820

UNITED STATES PATENT OFFICE 2,339,820

MOWER CUTTER BAR SUPPORT

Robert H. Sharpe, Oakland, Calif.

Application June 10, 1942, Serial No. 446,405

11 Claims. (Cl. 56—282)

The invention relates to crop harvesters, swathers, mowers and the like using an elongated oscillating cutter bar, and more particularly to means for supporting the cutter bar in proper relation to the ground during its course of movement over the ground.

An object of the present invention is to provide a mechanism attachable directly to the outer free end of the cutter bar which will provide a balanced floating support for the cutter bar and properly support the latter during movement over both smooth and uneven ground, such as over and through gulleys, and in addition better supporting the cutter bar in proper relation to the ground upon movement over ground which is soft, sandy, muddy, boggy peat land and the like.

Another object of the invention is to provide a mechanism of the character desscribed including a caster-follower supporting wheel in combination with a self-acting counter-balancing weight means functioning to maintain a proper balanced support for the cutter bar in the forward and rearward movements thereof.

A further object of the invention is to provide a mechanism of the character above in which the counter balancing support for the cutter bar is adjustable to accommodate the cutter bar to particular crops or particular ground conditions.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side elevation of a mower cutter bar support constructed in accordance with the present invention.

Figure 2 is a fragmentary side elevation similar to Figure 1 but showing the counter-balancing means shifted to balanced position in rearward movement of the cutter bar.

Figure 3 is a fragmentary plan view of the assembly shown in Figures 1 and 2.

Figure 4 is a fragmentary front elevation of the assembly shown in Figures 1 to 3.

Figure 5 is a side elevation similar to Figure 1 but showing a modified form of the invention.

Figure 6 is a fragmentary plan view of the modified form of the invention illustrated in Figure 5.

Figure 7 is a fragmentary perspective view of a part of the mechanism illustrated in Figures 5 and 6.

The mower cutter bar support of the present invention consists briefly of a lever means 11 secured adjacent one end thereof to the outer end 12 of the cutter bar 13 in combination with the ground engaging means 14 supporting the lever means 11 intermediate the latter's length and counter-balancing means 16 on the lever means 11 at the opposite side of the ground engaging means 14 and functioning to provide a balanced floating support for the outer end of the cutter bar. In addition mechanism 17 is provided for automatically shifting the counter-balancing means upon the lever means to maintain a proper balanced condition during the forward and rearward movements of the cutter bar.

A secondary support in the form of a ground engaging shoe 18 is secured to the outer end 12 of the cutter bar 13 and affixed to this shoe and extending vertically therefrom is an end plate 19. A crop separator or divider bar 21 is preferably fastened to the forward edge of the plate 19 and extends vertically and forwardly of the plate to divide the foliage. The rear edge of the end plate 19 is reinforced by a flange member 22 which projects upwardly and arcuately of the plate to serve as a guide, as will be more fully hereinafter explained. In the form of the invention illustrated in Figures 1 to 4, the apparatus is adapted for use with a crop pick-up reel 23 which is assembled upon a central reel shaft 24 for rotation over the cutter bar 13. In accordance with this arrangement, means is provided on the support for the cutter bar for also supporting the outer end 26 of the reel shaft 24. This means is here in the form of a bearing member 27 mounted at the upper end of a vertically adjustable post 28 which is telescopically carried in a supporting sleeve 29 fixed to the end plate 19. A locking bolt 31 passing through the sleeve and post serves to hold the post in desired vertical position. Preferably and as will be best seen from Figures 1 and 4, the sleeve 29 is welded directly to the end plate 19 so as to form an integral part thereof.

The lever means 11 is in the form of an elongated lever bar which is pivoted at its forward end 32 to the end plate and sleeve assembly by means of a horizontal pivot pin 33 having an axis parallel to the longitudinal axis of the cutter bar 13. The lever bar 11 is normally supported in approximately horizontal position by the ground engaging means 14, here in the form of a caster wheel 34 connected to the cutter bar by a supporting member 36 having a bifurcated lower end 37 straddling the wheel and journaled upon the wheel axle 38, and a vertical spindle part 39 supported for rotation within a vertical sleeve bearing 41 affixed to the lever bar 11. As will be seen from Figures 1 and 2, the axis of the spindle 39 is offset horizontally from the axis of the wheel whereby the wheel becomes a follower and swings about the axis of the spindle during the forward and rearward movements of the mechanism, as illustrated in Figures 1 and 2.

The counter-balancing means 16 is here constructed of a pair of weight members 42 and 43, see Figure 3, enclosed within a box-like casing 44 and the entire assembly is supported for longitudinal movement on the lever bar by means of rollers 46 and 47 carried on bearing pins secured to the weights 42 and 43. In this manner the counter-balancing means is adjustable longitudinally upon the lever bar 11 and is automatically displaced by the mechanism 17 so as to maintain a proper balanced floating support for the cutter bar in both the forward and rearward movements thereof. The mechanism 17 here consists of a crank 48 secured to and rotating with the upper end of the spindle 39 and attached links 49 and 51 connecting the counter-balancing weights to the crank. Preferably the crank 48 is formed of adjustable sections 52 and 53 so that the amount of throw of the crank may be adjusted, and similarly the link members 49 and 51 are adjustably connected to control the longitudinal position of the counter-balancing weight. Preferably the adjustment between the link members 49 and 51 is initially effected so as to provide a counter-balancing moment properly supporting the outer end of the cutter bar, and the crank arm 52 is adjusted to a length somewhat less than the diameter of the circle enscribed by the bottom of the wheel 34 around the spindle axis 39, whereby a slightly greater counter-balancing moment is obtained in the rearward moving position of the caster wheel, as illustrated in Figure 2, than is obtained in the forward moving position of the caster wheel, as illustrated in Figure 1. It will also be noted that the point of attachment of the lever bar and the wheel spindle is above the axis 38 of the wheel 34. Thus upon backing, the normal drag of the wheel serves as a fulcrum point setting up a counterclockwise movement (as viewed in Figure 1) to abruptly urge the elevation of the cutter bar. As the caster wheel swings to its position illustrated in Figure 2, in the backing movement, the counter-balancing means 16 is shifted longitudinally in proportion to the amount of rotation of the caster wheel about its spindle 39 so that in all of the intermediate rotated positions of the caster wheel, the weight distribution is compensated. Advantage may be taken of the automatic lifting of the cutter bar in backing to free the cutter bar whenever the same becomes choked with foliage and in every event it is desirable to raise the cutter bar when backing up or turning a corner to the right.

As above described, the lever means 11 is connected at its forward end to the cutter bar (through supporting means 19 and 29) whereby the lever means may swing in a vertical plane to follow uneven ground contour during the forward or rearward movement of the cutter bar. In order to relieve the pivot pin 33 from undue stress produced by lateral swinging of the lever means, I provide a vertical guide construction confining the movement of the lever bar to a vertical plane. This guide construction is here provided by extending the arcuate upper end 54 of the flange member 22 aforesaid through a vertical opening 56 in the lever bar, whereby the guide member 54 is confined between the opposite sides 57 and 58 of the opening. In certain instances the lever bar 11 will swing through a relatively long arc, even dropping the outer end 59 thereof to the ground as may occur in backing up on uneven or soft ground or in traversing a hole in the ground, and accordingly I mount an auxiliary ground engaging shoe 61 on this end of the lever bar for supporting the lever bar on the ground and limiting its downward movement.

It will be clear from the foregoing that the elevating force upon the outer end of the cutter bar is determined by the counter-balancing moment operating about the bottom of the caster wheel as a fulcrum. In the lever system thus provided the elements are the length between the bottom of the wheel and the pivot pin 33 coupled with the weight forwardly of the wheel, and the length between the bottom of the wheel and the center of gravity of the counter-balancing weight rearwardly of the bottom of the wheel. In the various rotated positions of the lever bar 11 about the pivot pin 33, the aforementioned distances are proportionately lengthened or foreshortened with the result that the elevating counter-balancing force applied to the cutter bar remains substantially constant during such movements of the lever bar. As a result the caster wheel may pass over and through gulleys and other uneven ground while constantly supporting the cutter bar.

A modified form of the invention has been illustrated in Figures 5 to 7 of the drawings, wherein the cutter bar support is adapted for use without the crop pick-up reel 23 described in the foregoing. In this form of the invention a fixed forwardly depending bracket 62 is secured to the forward end of the lever bar 11' and the lower forward end 63 of the bracket is pivoted to an end plate 19' secured to a ground engaging shoe 18' and the outer end 12' of the cutter bar. The plate 19', as in the first embodiment, is welded or otherwise secured directly to the shoe 18' and the upper side 64 of the plate is curled over to provide a smooth rolled top which inclines upwardly from the forward end 66 thereof to the lower end 63 of the bracket 62. A pivot pin 67 is here used to pivotally attach the end 63 of the bracket to the plate adjacent the upper end of the rolled face 64. In this manner a substantially continuously inclined surface is provided from the forward end 66 of the plate to the top of the cutter bar 11'. Also preferably, the bracket 62 is formed with substantially parallel sides 68 and 69 having a rolled or curved upper connecting side 71 which conforms in general to the curve of the rolled part 64, as may be seen from Figure 6. A crop separator bar 21' in this embodiment extends from the forward end 66 of the plate obliquely upwardly and inwardly, as will be seen in Figures 5 and 6, to deflect the crop toward the cutter bar. The curved upper side 71 of the bracket is formed with a guide opening 72 therethrough for the arcuately curved upper end 54' of the guide member secured to the plate 19', as in the first embodiment.

I claim:

1. A supporting means for the end of a mower cutter bar comprising, a lever means secured adjacent one end to the outer end of said cutter bar and extending at approximately right angles to the length of said cutter bar rearwardly in the direction of movement of said cutter bar, ground engaging means supporting said lever means intermediate its length and movable forwardly and rearwardly in the direction of said cutter bar, movable counter-balancing means on said lever means adjacent the opposite end thereof, and connecting means between said ground engaging means and counter-balancing means operative to automatically move said counter-balancing means reversely of said ground engaging means.

2. A mower cutter bar support comprising, a ground engaging shoe adapted to be secured to the outer end of said cutter bar, lever means pivotally secured at its forward end to said shoe and extending rearwardly therefrom at approximately right angles to said cutter bar, ground engaging means supporting said lever means intermediate its length and movable to and from said shoe, a counter-balancing weight on said lever means at the rearward side of said ground engaging means, and a connection between said ground engaging means and said weight for automatically moving said weight to and from said shoe upon reverse fore and aft movement of said ground engaging means.

3. A mower cutter bar support comprising, a ground engaging shoe adapted to be secured to the outer end of said cutter bar, lever means, pivotal connection means securing said shoe to the forward end of said lever means with the latter extending rearwardly at approximately right angles to said cutter bar, ground engaging means supporting said lever means intermediate its length, and a counter-balancing weight carried by said lever means at the rearward side of said ground engaging means.

4. A mower cutter bar support comprising, a ground engaging shoe adapted for connection to the outer end of said cutter bar, a vertical end plate secured to said shoe, a lever bar, pivotal connection means securing said plate to the forward end of said lever bar for movement of the latter about a horizontal axis parallel to said cutter bar, coacting vertical guide means on said plate and lever bar confining said pivotal movement to a vertical plane, ground engaging means supporting said lever bar intermediate its length, and a counter-balancing weight carried by said lever bar rearwardly of said ground engaging means.

5. A mower cutter bar support comprising, a ground engaging shoe adapted for connection to the outer end of said cutter bar, a vertical end plate secured to said shoe, a lever bar, pivotal connection means securing said plate to the forward end of said lever bar for movement of the latter about a horizontal axis parallel to said cutter bar, said lever bar being formed with a vertical guide slot, an arcuate guide arm extending vertically from said plate through said slot to confine the pivotal movement of said lever bar to a vertical plane, ground engaging means supporting said lever bar intermediate its length, and a counter-balancing weight carried by said lever bar rearwardly of said ground engaging means.

6. A mower cutter bar support comprising, a lever means secured adjacent one end to the outer end of said cutter bar, a ground engaging wheel, a connection member for said wheel secured to said lever bar intermediate its length for rotation about a vertical axis offset from the axis of said wheel, a counter-balancing weight carried by said lever bar adjacent its opposite end for longitudinal movement on said lever bar, and means connecting said weight to said wheel supporting member and operating to move said weight longitudinally on said lever bar upon rotation of said member.

7. A mower cutter bar support comprising, a lever means secured adjacent one end to the outer end of said cutter bar, a ground engaging wheel, a connection member for said wheel secured to said lever bar intermediate its length for rotation about a vertical axis offset from the axis of said wheel, a counter-balancing weight carried by said lever bar adjacent its opposite end for longitudinal movement on said lever bar, a crank secured to said member, and a link connecting said crank and said weight.

8. A mower cutter bar support comprising, a lever means secured adjacent one end to the outer end of said cutter bar, a ground engaging wheel, a connection member for said wheel secured to said lever bar intermediate its length for rotation about a vertical axis offset from the axis of said wheel, a counter-balancing weight carried by said lever bar adjacent its opposite end for longitudinal movement on said lever bar, and means connecting said weight to said wheel supporting member and operating to move said weight longitudinally on said lever bar upon rotation of said member, said last named means being adjustable to permit a selective spacing between said weight and said member and for varying the amplitude of movement of said weight upon rotation of said member.

9. A mower cutter bar support comprising, a ground engaging shoe adapted to be secured to the outer end of said cutter bar, lever means, pivotal connection means securing said shoe to the forward end of said lever means with the latter extending rearwardly at approximately right angles to said cutter bar, ground engaging means supporting said lever means intermediate its length, a counter-balancing weight carried by said lever means at the rearward side of said ground engaging means, and a ground engaging shoe carried by said lever means at the rear end thereof.

10. A mower cutter bar support comprising, a ground engaging shoe adapted for connection to the outer end of said cutter bar, a vertical end plate secured to said shoe, an elongated lever bar pivoted to said plate at the forward end of said bar, ground engaging means supporting said lever bar intermediate its length, a counter-balancing weight on said lever bar adjacent the opposite end thereof, and supporting means carried by said plate providing a bearing support for the outer end of a crop pick-up reel shaft.

11. A mower cutter bar support comprising, a shoe adapted for connection to the outer end of said cutter bar, and having the upper side thereof sloping upwardly and rearwardly, an elongated lever bar, a mounting bracket connected to the forward end of said lever bar and sloping forwardly and downwardly to the rear upper end of said shoe and pivoted thereto about a horizontal axis and providing with said shoe a generally inclined surface from the forward end of said lever bar to the ground, a ground engaging wheel carried by said lever bar intermediate its length, and a counter-balancing weight mounted on said lever bar adjacent the rear end thereof.

ROBERT H. SHARPE.